United States Patent
Eilam et al.

(10) Patent No.: US 9,577,946 B1
(45) Date of Patent: Feb. 21, 2017

(54) ACCOUNT-SPECIFIC LOGIN THROTTLING

(71) Applicant: hopTo, Inc., Campbell, CA (US)

(72) Inventors: Eldad Eilam, San Jose, CA (US); Christoph Berlin, Milpitas, CA (US)

(73) Assignee: hopTo, Inc., Campbell, CA (US)

( * ) Notice: Subject to any disclaimer, the term of this patent is extended or adjusted under 35 U.S.C. 154(b) by 223 days.

(21) Appl. No.: 14/588,887

(22) Filed: Jan. 2, 2015

Related U.S. Application Data

(60) Provisional application No. 61/923,633, filed on Jan. 3, 2014.

(51) Int. Cl.
  *G06F 15/16* (2006.01)
  *H04L 12/825* (2013.01)
  *H04M 1/725* (2006.01)

(52) U.S. Cl.
  CPC .......... *H04L 47/25* (2013.01); *H04M 1/72525* (2013.01)

(58) Field of Classification Search
  CPC .......................... H04L 47/25; H04M 1/72525
  See application file for complete search history.

(56) References Cited

U.S. PATENT DOCUMENTS

| | | | | |
|---|---|---|---|---|
| 6,151,643 A * | 11/2000 | Cheng | ........................ | G06F 8/62 709/200 |
| 7,644,131 B2 * | 1/2010 | Levanon | .................... | G06F 3/14 345/625 |
| 9,065,792 B2 * | 6/2015 | Knight | .................... | G06Q 10/10 |
| 9,154,612 B2 * | 10/2015 | Moshir | ................. | G06F 21/552 |
| 9,232,077 B2 * | 1/2016 | Yu | ........................... | H04L 12/14 |
| 9,264,556 B2 * | 2/2016 | Zalmanovitch | ....... | H04W 24/02 |
| 2002/0120753 A1 * | 8/2002 | Levanon | .................... | G06F 3/14 709/228 |
| 2004/0181591 A1 * | 9/2004 | Yu | ........................... | H04L 12/14 709/217 |
| 2007/0093243 A1 * | 4/2007 | Kapadekar | ........ | H04M 3/42178 455/419 |
| 2008/0176540 A1 * | 7/2008 | Khedouri | .......... | G06F 17/30038 455/414.1 |
| 2008/0294640 A1 * | 11/2008 | Yost | ................... | G06F 17/30029 |
| 2014/0172603 A1 * | 6/2014 | Rondan | ................ | G06Q 20/123 705/21 |

OTHER PUBLICATIONS

U.S. Appl. No. 14/340,307, Christoph Berlin, Host-Aware New File Creation, filed Jul. 24, 2014.
U.S. Appl. No. 14/458,133, Eldad Eilam, Device-Specific Remote Photo Viewing, filed Aug. 12, 2014.

* cited by examiner

*Primary Examiner* — Krisna Lim
(74) *Attorney, Agent, or Firm* — Polsinelli LLP

(57) ABSTRACT

Systems and methods for account specific login throttling are provided. A user with a user account may submit a request to a server regarding download of an application onto one or more user devices associated with the server. The server may determine that the current load of request is more than it handle, assign a number to the request, and send a responsive message includes information about when the application will be made available to the user account for download. Once the allotted number is called and the server is ready to make the application available to the user account, the server may send notification to the user. account. The user may then download the application onto the one or more client devices associated with the user account.

17 Claims, 2 Drawing Sheets

ACCOUNT-SPECIFIC LOGIN THROTTLING

CROSS-REFERENCE TO RELATED APPLICATIONS

The present invention claims the priority benefit of U.S. provisional patent application No. 61/923,633 filed Jan. 3, 2014, the disclosure of which is incorporated herein by reference.

BACKGROUND

Field of the Invention

The present invention generally relates to downloading applications. More specifically, the present invention relates to an account-specific login throttling for downloading applications.

Description of the Related Art

Presently available systems allow individuals to download a variety of applications to their electronic devices at any time. Online application stores, such as the iTunes® App Store, are used by various software developers to make applications available to customers. In circumstances where an application is popular (e.g., "goes viral"), there may be problems when millions of people attempt to download the same application at one time. The application developer may not be prepared for so many people to bombard the server hosting the application with requests for download. In such instances, the server may not be capable of handling that many requests at once, thereby resulting in system failure (e.g., crashing) and/or the application becoming otherwise unavailable for download. In such situations, users may be become frustrated at the unavailability of the application and/or unresponsiveness of the (crashed) system. Not only may such users fail to download the applications, but they may further perceive the developer as being an unreliable source, leading them to avoid downloading other applications by that developer. Such users may also tell others of their experience, leading to loss of additional customers in this regard. Application developers naturally do not want to lose users or achieve such a reputation.

There is, therefore, a need in the art for improved systems and methods for downloading applications onto electronic devices.

SUMMARY OF THE CLAIMED INVENTION

Embodiments of the present invention include systems and methods for account-specific login throttling for downloading applications. Requests for downloading applications may be funneled in a pre-determined order. For example, when a user requests an application be downloaded to a user device, the user account of that user may be given a number or placeholder that indicates when the user will be able to download the application. When the designated time arrives, one or more devices associated with the user account may be sent a notification, which may include a link to the application. Such a link may allow for the application to be downloaded to one or more of the user devices associated with the user account.

In an embodiment of the present invention, a system may include a communication network, a server, and one or more client devices that are associated with a user account. A user using one of the user devices may send a request to the server hosting the application. The request may concern download of the application to one or more devices associated with the user account. The server may evaluate the number of requests that have been received and are being processed, determine that the request cannot be processed immediately, assign a number (or placeholder) based on the number of requests that need to be processed, and send a message to the user account indicating the assigned number and an estimated time as to when the application will be ready to download to one or more of the user devices. When the designated time arrives, the application may be made available and a message sent to notify the user regarding the same. In this regard, the server may throttle downloads by controlling the number of users allowed to download per pre-determined unit of time. Such a system may be account-specific, not device-specific. A user may have multiple user devices (e.g., iPhone®, Ipad®), but need only one user account (e.g., iTunes® account). Thus, when a user request a download of an application at or after the allotted time, the application may be downloaded onto any one or more of the devices associated with the user account.

Other embodiments of the present invention include non-transitory computer-readable storage media on which is embodied instructions executable to perform a method for providing account-specific throttling for downloading applications as previously set forth above.

DETAILED DESCRIPTION

Systems and methods for account-specific login throttling when downloading an application are provided. When a user account requests that an application be downloaded onto an electronic device, the request may be evaluated in light of the other requests being received and processed. The server may determine that it is unable to immediately process all incoming requests. The requests that cannot be handled immediately may therefore be assigned a number or placeholder. In some embodiments, the requests may be assigned to an allotted timeframe during which (or afterwards) the user may be allowed to download the application. In response to such a request, therefore, the user may be sent a message with the assigned number, placeholder, or allotted timeframe.

The number of users allowed to download the application at any one time may thereby be throttled. Thus, when there are more users attempting to download the application than what the server is programmed to perform, the user is placed in a queue until the server is available to download that application. When the user's assigned number comes up (or the allotted time has arrived, etc.), the server may send the user a notification. Such notification may include, inter alia, a synchronized timer indicating the amount of time until the application is available for downloading, how long the application will be available, a link for downloading the application, and/or instructions for the download.

As such, users that request to download an application may be put into a queue that provides for a time triggered sign-up process. Such a sign-up process may be a time based, predictive approach providing an estimate of how long it will take to download an application. In one embodiment, the system controls how many users are allowed to download the application during a pre-determined amount of time. Alternatively, a user may be given a time estimate of when they will be able to download the application.

Figure 1:
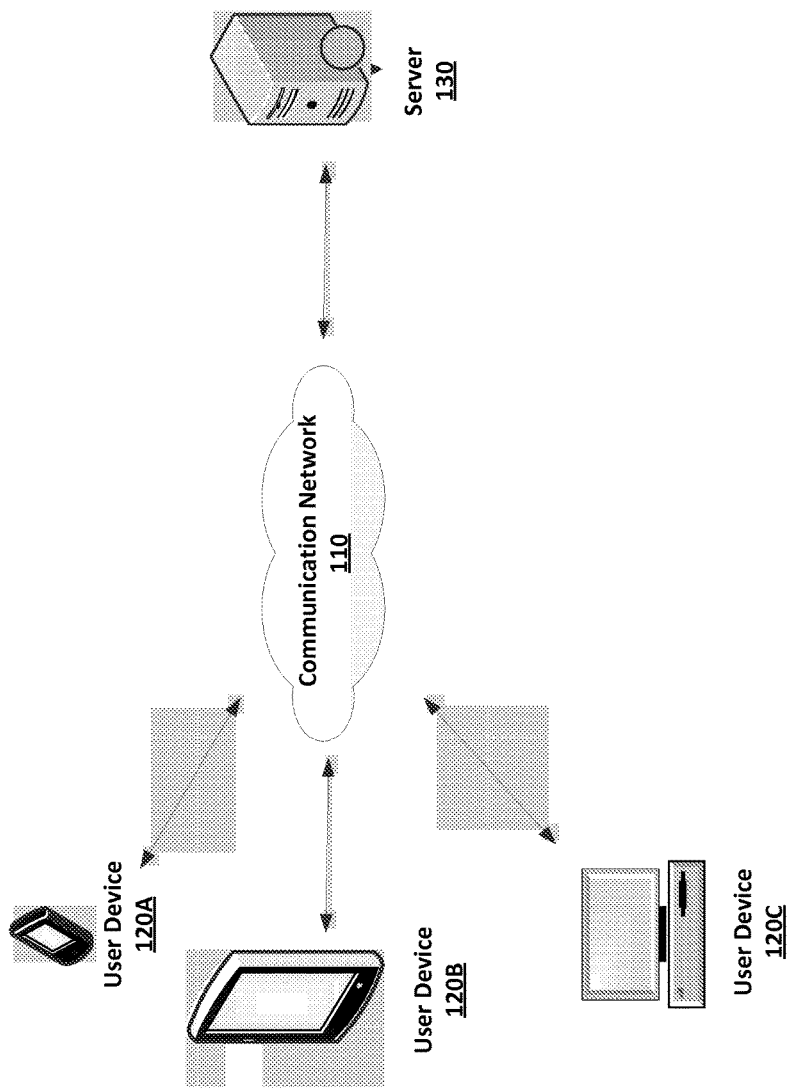
FIG. 1 illustrates a network environment in which an exemplary system for account-specific throttling may be implemented.

FIG. 1 illustrates a network environment 100 in which a system for account-specific throttling may be implemented. Network environment 100 may include a communication network 110, one or more user devices 120A-D, and a server 130. Devices and services in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic computing user devices 120A-D, which may include general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. Such devices 120A-D may also be configured to access data from other storage media, such as, but not limited to memory cards or disk drives as may be appropriate in the case of downloaded services. Such devices 120A-D may include standard hardware computing components such as, but not limited to network and media interfaces, non-transitory computer-readable storage (memory), and processors for executing instructions that may be stored in memory.

User device 120A is illustrated as a mobile phone or smartphone, user device 120B is illustrated as a tablet computing device, user device 120C is illustrated as a desktop computing device, and user device 120D is illustrated as a laptop computing device. As can be seen, each device is sized differently and/or has different input options. Exemplary embodiments of the present invention allow for tasks and applications that are specific to one device (e.g., operating in a Microsoft Windows® environment) to be used and optimized for another user device (e.g., operating in an Apple iOS® environment). A user device 120 may further include a client application, a client 3D library, and a client display driver. Collectively, these elements may enable the user device and the user to consume computer graphics resources or services provided by server 130.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may be used to host an application, as well as manage requests for download. In an exemplary embodiments, server 130 receives a request from a user device 120 regarding download of the application. When the server 130 is receiving more requests than it can handle at the time, it may not immediately provide the application for download in response to all requests. Instead, the requests that cannot be handled immediately may be placed in a queue and assigned a number (or timeframe). Such a number may be assigned based on the total number of incoming requests, the capabilities of the server, developer restrictions, etc. The server 130 may then tracks when it may be able to process each request. When a request can be processed (e.g., a number comes up or the allotted timeframe arrives), the server 130 may send a notification to the user account associated with the request. The notification may be sent and the application made available for download onto on any user device 120 associated with the account.

Figure 2:
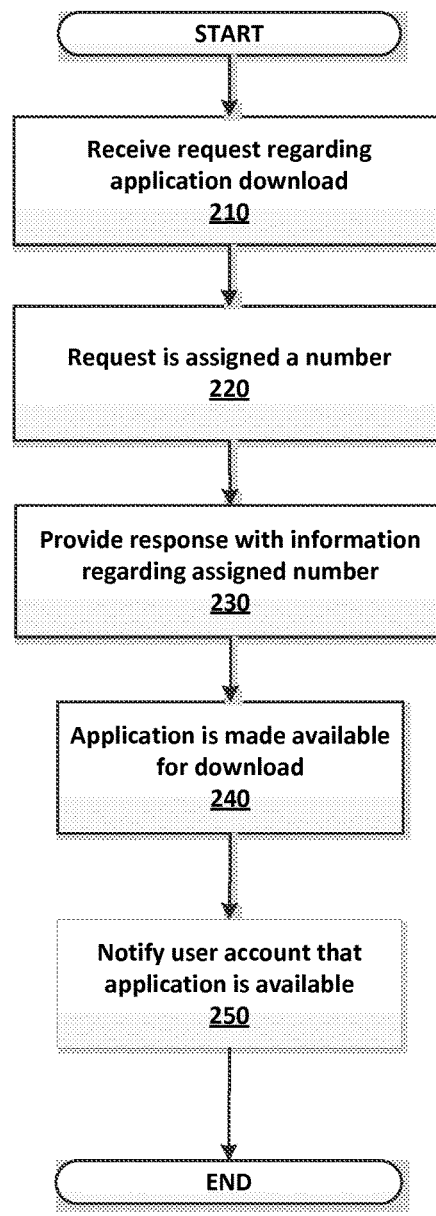
FIG. 2 is a flowchart illustrating an exemplary method for providing account-specific throttling for downloading applications.

FIG. 2 illustrates a method 200 for providing account-specific login throttling when downloading an application. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a server receives a request from a user account to download an application onto an electronic device. The request is funneled or placed in a predetermined order with other requests. Information regarding what "place" the request is in based on the predetermined order is provided to the user account and gives an estimated time when the application is available for download by the user.

In step 210, server 130 receives a request from a user account to download an application onto a client device (e.g., user device 120B). It may be determined that the server is unable to process all the incoming requests at once.

In step 220, the request is received placed in a predetermined order along with other incoming requests and assigned a number or allotted time.

In step 230, information may be provided to the user account regarding when the application will be available for download. In some embodiments, the user may be provided with a timer that counts down the days, hours, minutes, seconds until the application is ready for download. The specific number or allotted time may be assigned based on a number of factors known in the art, including total number of incoming requests, the capabilities of the server 130, and/or developer restrictions.

In step 240, the window for downloading is open, and the application is made available to the user for downloading onto an electronic device.

In step 250, a notification is sent to the user account that the application is available for download, and the user is then able to download the application. In another embodiment, the application may be automatically downloaded onto the electronic device upon connection to the communications network at a time after the window has opened either with or without requiring further user interaction. For example, once the window for downloading has opened, a notification is sent to the user account that states, for example, that the user has been granted access to the application and is now able to log on. The user may then be free to download the application and use it on an electronic device.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for account-specific throttling, the method comprising:
    receiving a request from a user account regarding download of a hosted application onto one or more of a plurality of user devices associated with the user account;
    executing instructions stored in memory, wherein execution of the instructions by a processor:
        determines that the request cannot be handled due to a total number of incoming requests exceeding a predetermined limit,
        assigns a number to the request in a predetermined order in accordance with a sequence in which the requests was received relative to other requests;
    providing information to the user account regarding the assigned number and an estimate when the application will be made available to the user account for download; and
    sending a notification to the user devices associated with the account when the application is made available to the user account for download.

2. The method of claim 1, further comprising providing the user devices associated with the user account with a timer display that counts down an amount of time until the application is to be made available to the user account for download.

3. The method of claim 2, wherein the amount of time is adjusted based on a total number of incoming requests.

4. The method of claim 2, wherein the amount of time is adjusted based on an updated status of one or more servers that provide the application for download, and wherein the updated status pertains to updated capabilities for downloading.

5. The method of claim 2, wherein the amount of time is adjusted based on a developer restriction.

6. The method of claim 1, further comprising restricting the user devices associated with the user account from downloading the application until the notification is sent.

7. The method of claim 1, wherein the application is made available to the user account for download within a predetermined timeframe from the sending of the notification.

8. The method of claim 7, further comprising providing the user devices associated with the user account with a timer display that counts down the predetermined timeframe that the application will remain available to the user account for download.

9. A system for account-specific throttling, the system comprising:
    a communication interface that receives a request from a user account regarding download of a hosted application onto one or more of a plurality of user devices associated with the user account; and
    a processor that executes instructions stored in memory, wherein execution of the instructions by a processor:
        determines that the request cannot be handled due to a total number of incoming requests exceeding a predetermined limit,
        assigns a number to the request in a predetermined order in accordance with a sequence in which the requests was received relative to other requests;
    wherein the communication interface provides information to the user account regarding the assigned number and an estimate when the application will be made available to the user account for download, and sends a notification to the user devices associated with the account when the application is made available to the user account for download.

10. The system of claim 9, wherein the communication interface further provides the user devices associated with the user account with a timer display that counts down an amount of time until the application is to be made available to the user account for download.

11. The system of claim 10, wherein the amount of time is adjusted based on a total number of incoming requests.

12. The system of claim 10, wherein the amount of time is adjusted based on an updated status of one or more servers that provide the application for download, and wherein the updated status pertains to updated capabilities for downloading.

13. The system of claim 10, wherein the amount of time is adjusted based on a developer restriction.

14. The system of claim 9, further comprising restricting the user devices associated with the user account from downloading the application until the notification is sent.

15. The system of claim 9, wherein the application is made available to the user account for download within a predetermined timeframe from the sending of the notification.

16. The system of claim 15, further comprising providing the user devices associated with the user account with a timer display that counts down the predetermined timeframe that the application will remain available to the user account for download.

17. A non-transitory computer-readable storage medium, having embodied thereon a program executable by a processor to perform a method for account-specific throttling, the method comprising:
- receiving a request from a user account regarding download of a hosted application onto one or more of a plurality of user devices associated with the user account;
- determining that the request cannot be handled due to a total number of incoming requests exceeding a predetermined limit;
- assigning a number to the request in a predetermined order in accordance with a sequence in which the requests was received relative to other requests;
- providing information to the user account regarding the assigned number and an estimate when the application will be made available to the user account for download; and
- sending a notification to the user devices associated with the account when the application is made available to the user account for download.

* * * * *